(12) United States Patent
Baugh

(10) Patent No.: US 6,609,734 B1
(45) Date of Patent: Aug. 26, 2003

(54) TORUS TYPE CONNECTOR

(76) Inventor: Benton F. Baugh, 14626 Oak Bend, Houston, TX (US) 77079

(*) Notice: Subject to any disclaimer, the term of this patent is extended or adjusted under 35 U.S.C. 154(b) by 0 days.

(21) Appl. No.: 10/071,190

(22) Filed: Feb. 11, 2002

(51) Int. Cl.[7] ................................................. F16L 21/06
(52) U.S. Cl. ..................... 285/322; 285/323; 285/123.4; 285/123.13; 285/123.9; 285/920
(58) Field of Search ................................. 285/920, 322, 285/323, 123.4, 123.9, 123.13

(56) References Cited

U.S. PATENT DOCUMENTS

| | | |
|---|---|---|
| 3,096,999 A | 7/1963 | Ahlstone |
| 3,222,088 A | 12/1965 | Haeber |
| 3,492,027 A | 1/1970 | Herring |
| 3,554,579 A | 1/1971 | Brown |
| 4,516,795 A | 5/1985 | Baugh |

*Primary Examiner*—Lynne H. Browne
*Assistant Examiner*—G M Collins

(57) ABSTRACT

A connector for the connection of pressure vessels utilizing toroidal surfaces to achieve a maximum of contact area sliding parallel to motion of locking segment when achieving high preload to minimize high stress contact points and the resultant wear when subjected to multiple operations and orientation means to cause any wear to be repeatedly in the same area such that selected critical areas will not be subjected to high contact stress wear.

7 Claims, 6 Drawing Sheets

TORUS TYPE CONNECTOR

BACKGROUND OF THE INVENTION

The field of this invention is that of remotely actuated connectors for connecting pressure vessels together. Most typically, the connection is made between the wellhead housings of oil or gas wells on the ocean floor and a blowout preventer stack. The connection is also frequently used between portions of the blowout preventer stack.

The connectors typically have shoulders on each of the pressure vessels and interconnecting sections or dogs which engage the shoulders. The sections or dogs are driven into engagement by tapered surfaces approaching them. These connectors can be seen in patents such as Haeber U.S. Pat. No. 3,222,088, Ahlstone 3,096,999, Herring U.S. Pat. Nos. 3,492,027, and 3,554,579. These connectors have the characteristic of a tendency to release due to the 4 degree angle of engagement. Literally these connectors frequently have an additional connector means to keep them connected. In some cases they lock the hydraulic fluid in the operating cylinders to keep them locked.

An additional problem with the connectors is that a high make-up preload is desired, but the coefficient of friction can vary between 0.1 and 0.2. The angle of 0.1 coefficient of friction is 5.7 degrees and the angle of 0.2 coefficient of friction is 11.3 degrees. The preload of the connector is a function of the pressure times the sum of the connector angle plus the coefficient of friction angle. This sum is $4°+5.7°=9.7°$ in one case and $4°+11.3°=15.3°$ in the other case. This is a $15.3°/9.7°=57\%$ variation in preload. Contemporary connectors are seeking a 7,000,000 lb. preload, so a 57% change in preload is considerable.

U.S. patent Baugh U.S. Pat. No. 4,516,795 addressed these problems by utilizing a torus ring to actuate the segments, such that the torus ring balanced the forces or even went slightly over center to prevent the tendency to release. A torus is basically a donut shape, with a portion of a torus being any section around the donut. While solving a first problem, the inter-relationship of the torus ring and the conical surfaces of the pressure vessels causes some high contact stress locations which were not desirable. Additionally, when the opposing surfaces of the torus were slipped in relationship to one another, the fit of the parts caused other high contact stress areas.

The Baugh U.S. Pat. No. 4,516,795 connector attempted to control the variation of preload by having a fixed torus diameter, which was not affected by friction angles. A problem associated with this was that the high stress areas would tend to cause wear and require readjustment on the diameter to maintain the predicted preload.

The inter-relationship of the torus profile and the locking of the connector was functionally to "roll" the locking segment into position over conical clamp hubs. The "rolling" onto conical clamp hubs inherently caused high stress areas and wear.

SUMMARY OF THE INVENTION

The object of this invention is to provide a connector which provides the predictable preload and lack of release tendency associated with the Baugh U.S. Pat. No. 4,516,795 connector, but minimizes the tendency for high stress contact areas associated with the mating torus surfaces between the actuating torus and the locking segments.

A second object of the present invention is to provide a second torus profile for facilitating movement and stress reduction between the locking segment and the locking shoulders on one of the two pressure vessels.

A third object of the present invention is to provide a known orientation between the locking segments during the locking movement such that any wear which occurs will be in the same area and the remaining areas will not be subjected to dimension altering wear movements.

Another object of the present invention is

DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
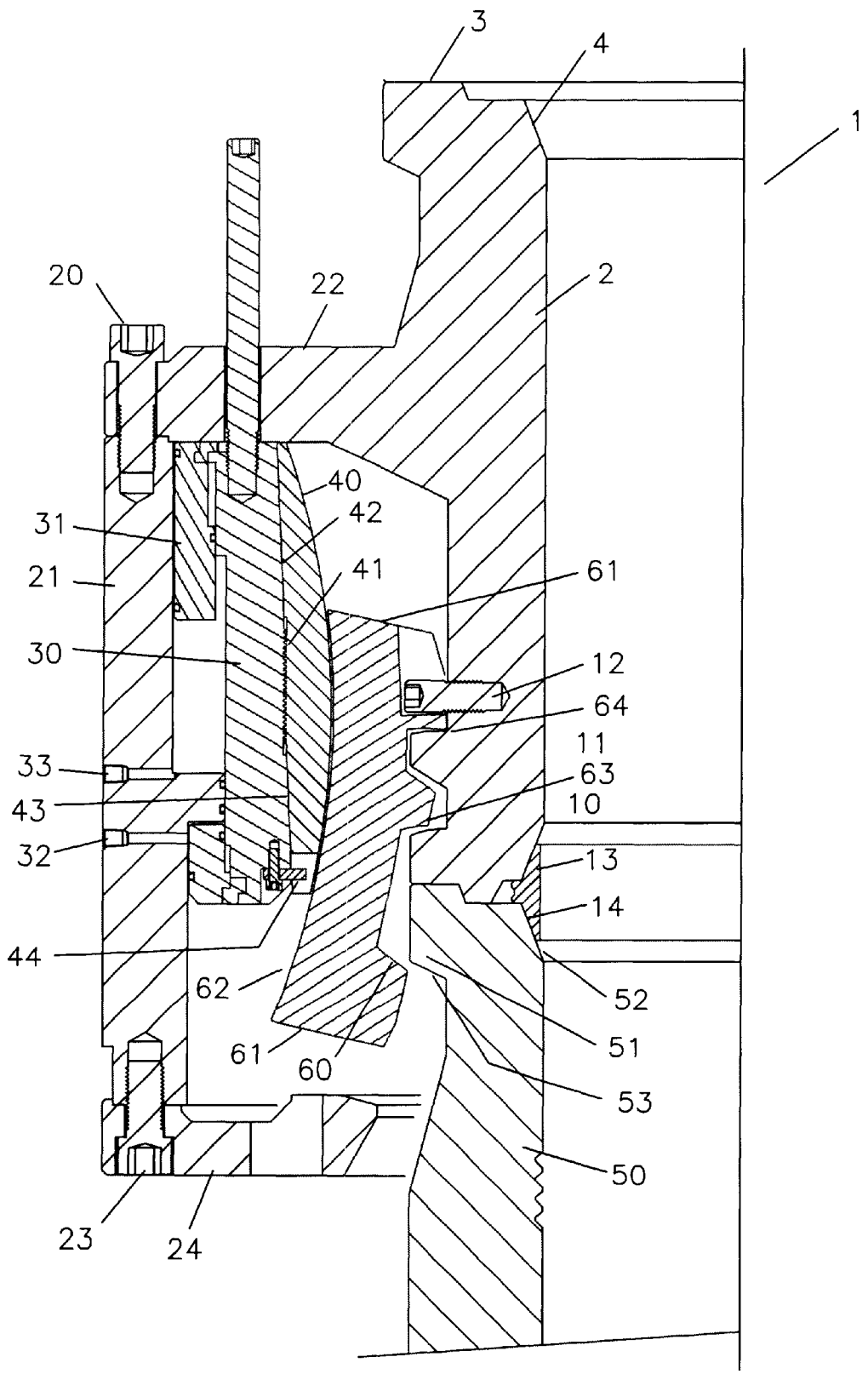
FIG. 1 is a quarter section of the connector in the unlocked position.

Referring now to FIG. 1, a connector 1 is shown having a body 2 with an upper hub profile 3, and a seal area 4 for interconnection to a subsea blowout preventer stack. At the lower end the connector body 2 has a first connector hub 10, a second connector hub 11, an orientation pin 12, a seal surface 13 and a seal ring 14.

Bolts 20 connect cylinder 21 to the upper flange portion 22 of body 2 and bolts 23 connect lower plate 24 to the lower end of cylinder 21.

Inner piston 30 and outer piston 31 are moved in response to flow in ports 32 and 33 to lock or unlock the connector 1 respectively. Actuating torus 40 engages the inner profile of the inner piston 30 via a thread 41 and tapered sections 42 and 43. The actuating torus 40 is split and when the tab 44 is removed the actuating torus 40 can be rotated along thread 41 and tapered sections 42 and 43 to change the torus internal diameter and thereby to adjust the preload of the connector.

The wellhead housing 50 has a housing hub 51, a seal area 52 as are well understood in the industry. The surface 53 which is to be engaged by surface 60 of locking segment 61 is an industry standard conical surface.

Locking segment 61 has an outer toroidal surface 62 for engaging the actuating torus 40. The locking segment 61 also has toroidal surfaces at 63 and 64, which will be discussed later.

Figure 2:
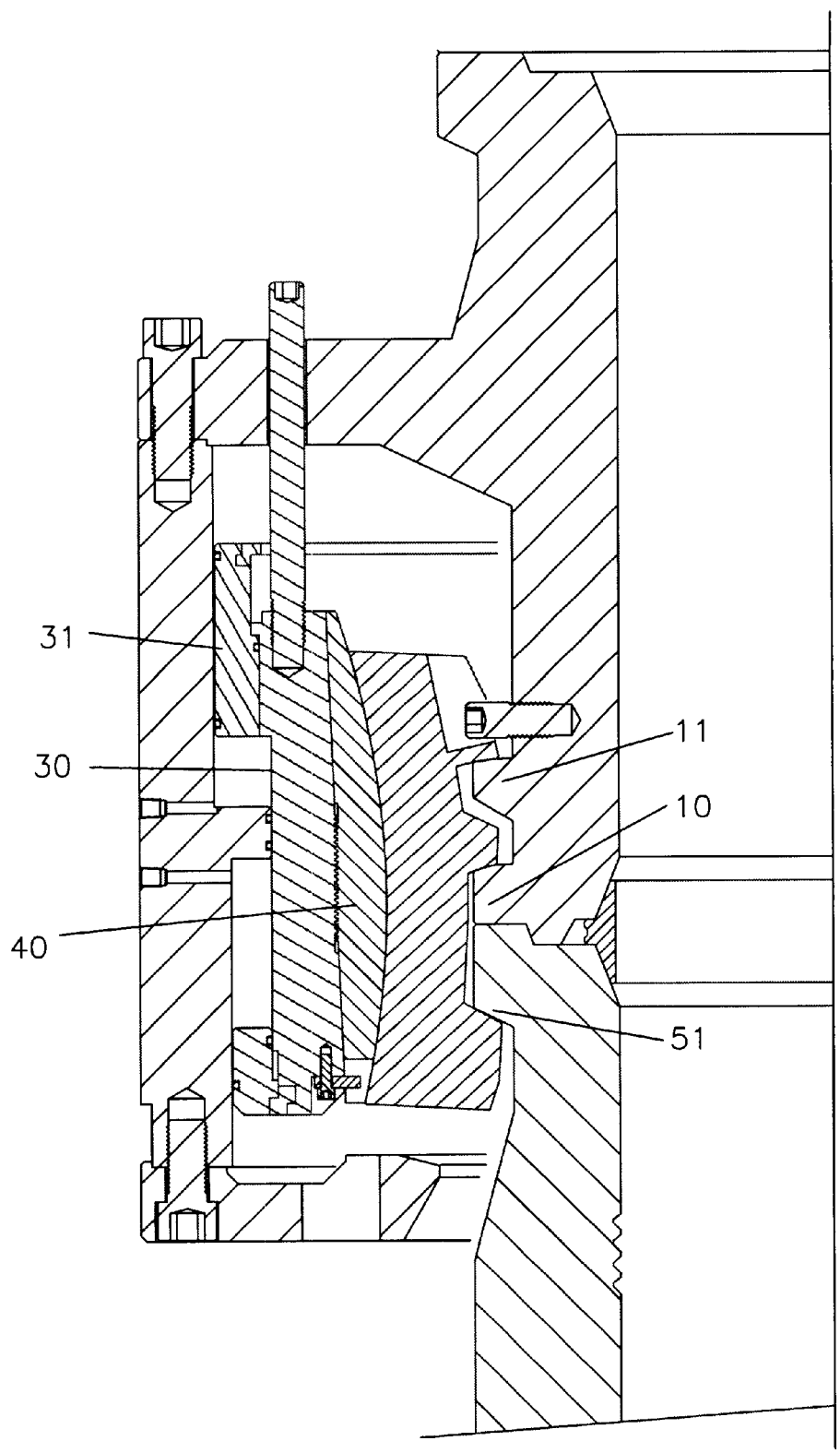
FIG. 2 is a quarter section of the connector in a partially locked position.

Referring now to FIG. 2, the inner piston 30 and outer piston 31 are moved down with the actuating torus 40 rocking the locking segment 61 onto the hubs 51, 10, and 11.

Figure 3:
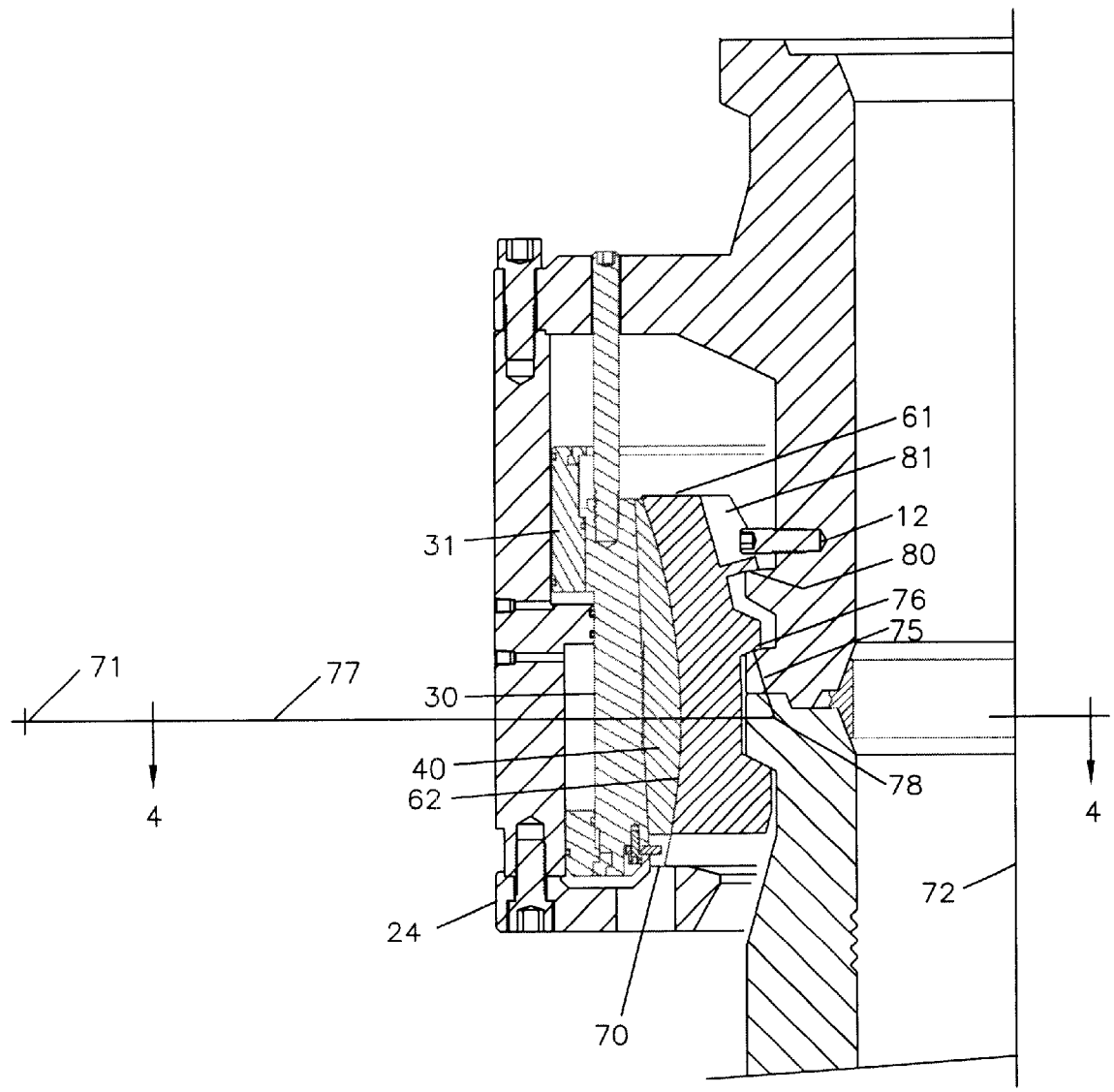
FIG. 3 is a quarter section of the connector in the locked position.

Referring now to FIG. 3, the inner piston 30 and outer piston 31 have moved fully down such that the actuating torus 40 contacts the lower plate 24 at 70, such that the connector is fully locked. Torus center 71 is shown which is the geometric center of the torus profile 62. As the actuating torus moved down to the present position, the portion of the locking segment below the torus center 71 was moving toward the housing centerline 72 and the portion of the locking segment above the torus center 71 was moving away from the housing centerline 72.

Line 75 extends from the surface 76 at approximately 17.1 degrees with respect to the housing centerline 72. The rationale for the 17.1 degrees will be discussed later. The intersection of line 75 and the line 77 from the center 71 intersect at 78. As will be discussed later, the locking segment approximately rotates about the point at 78. As the locking segment 61 is approximately rotating about point 78 when at the highest loaded condition as seen in FIG. 3, it is appropriate that the surfaces at 76 and 80 be concentric torus surfaces about the circular centerline which is implied by the point 78 in this figure. By making these surfaces torus surfaces about the centerline of movement, the wear causing mismatch is minimized to the greatest extent possible.

To some degree, as the surfaces are rotated, some mismatch cannot be avoided and some question will always arise as to how much wear this will actually cause. In some cases the wear will be at the edges of the segment, and in some cases the wear will be at the centerline of the segments. The propose of the orientation pin 12 and the matching slot 81 are to keep the locking segments 61 in the same orientation at all times. This will cause the wear to be restricted always to the same area (i.e. at the edges of the locking segment) and will allow the other areas to remain unworn. When the connector is fully locked, unworn contact areas will be engaged giving a known fit and preload characteristic.

Figure 4:
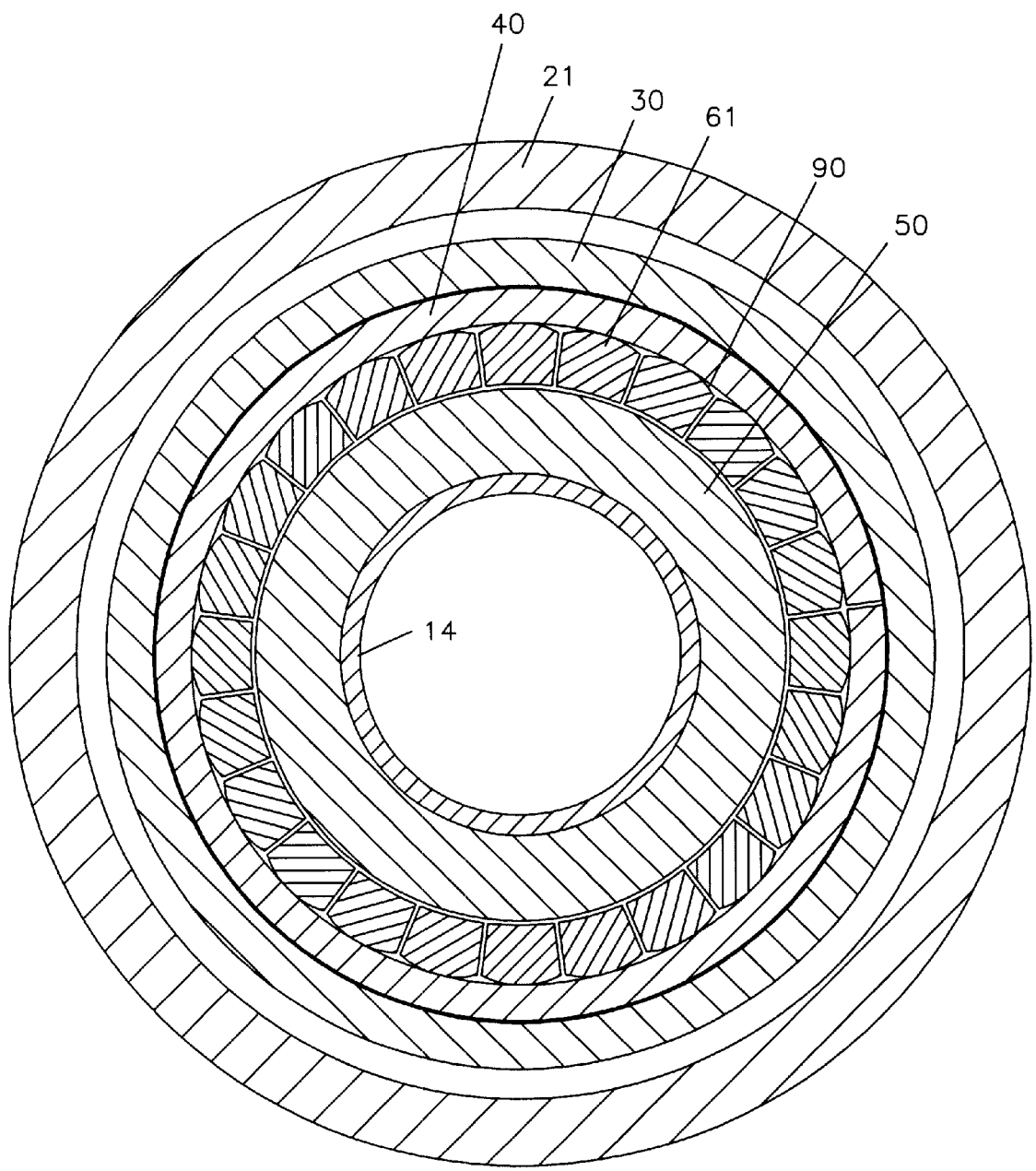
FIG. 4 is a cross section of the connector.

Referring now to FIG. 4, the locking segments 61 are shown with the contact with the actuating torus 40 only existing near the centerline of the locking segment 61. The purpose of this is that the wider the locking segment, the more mismatch will occur when the locking segment is rolled out of the position of original orientation. As one might imagine, if the locking segment 61 were infinitely thin, it would be able to move always around a mating torus and stay in full contact all the time. The wider the torus, the more the surfaces will mismatch as the locking segment moves around the torus. Due to the relatively complex torus profile on the back of the locking segments, a preferred way to machine these clearances 90 on the sides of the locking segments 61 is to first machine the torus section on a lathe, and then put the cut locking segments in a fixture at a smaller diameter than the original diameter and the partially remachining the back profiles. This will provide a clearance profile which has a similar contour to the original profile. This reduction in the contact area on the back side of the locking segments will not cause high stress conditions as the remaining surface areas are still much larger than the projected areas of the hubs the locking segment is engaging.

Figure 5:
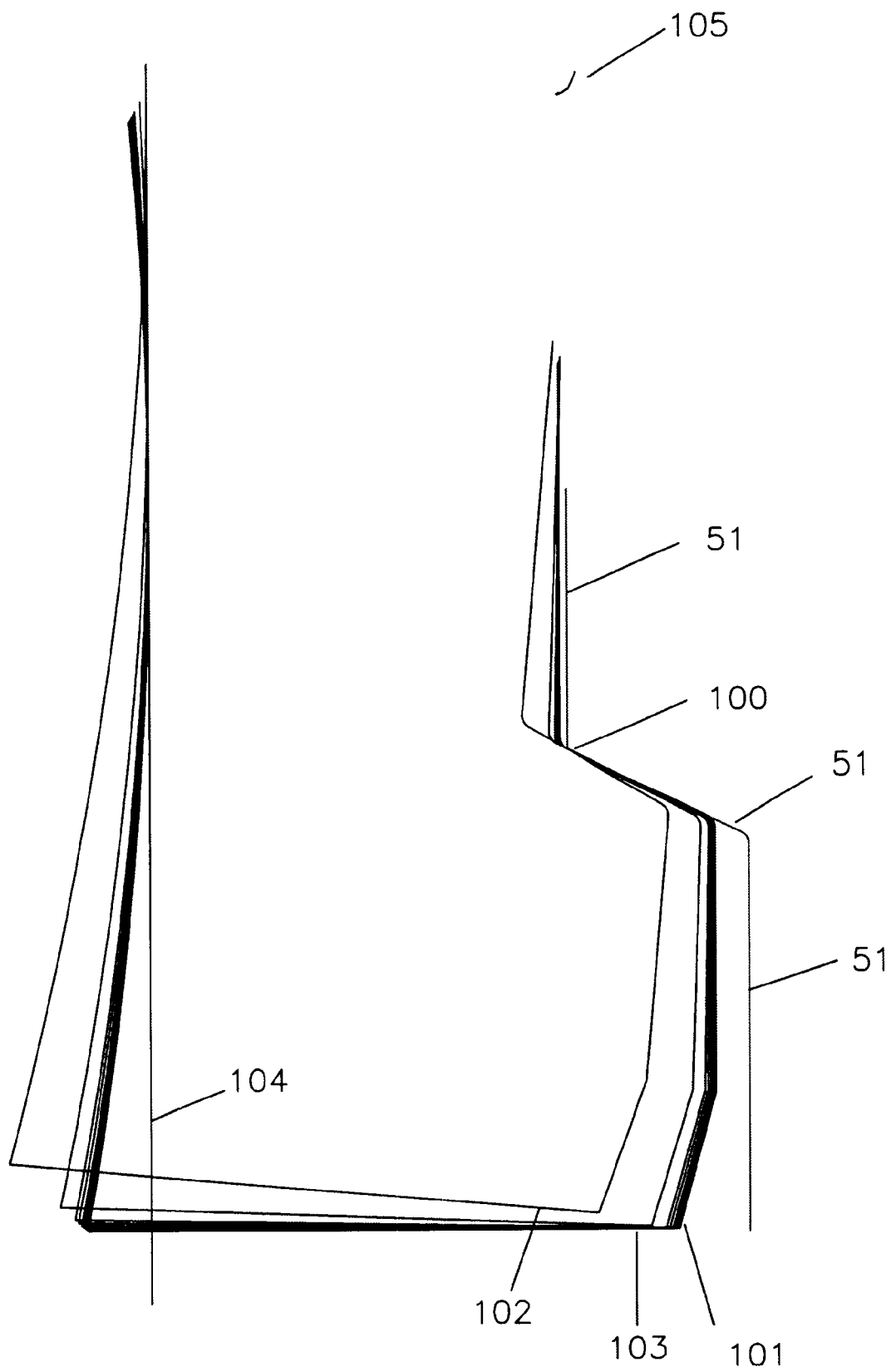
FIG. 5 is an overlay of a portion of the locking segment being closed showing various positions as defined by being engaged with the actuating torus and contacting the lower, outer corner of the housing hub. A locus of points is shown illustrating the position of the surface to mate with first connector hub.

Referring now to FIG. 5, the profile of the housing hub 51 is shown, with point 100 indicating the outer corner of engagement with the locking segment. Line 101 indicates the position of locking segment 61 when it is fully engaged and line 102 indicates the position of locking segment 61 when it is rotated 5 degrees out of position. Lines indicated at 103 give a variety of positions in between. Line 104 indicates the inner tangent to the torus section, such that the locking segment is kept tangent to this line in all positions. At 105 is a locus of points on the torus surface 76 of the locking segment, assuming the contact is maintained with the clamp hub 51 and the line 104.

Figure 6:
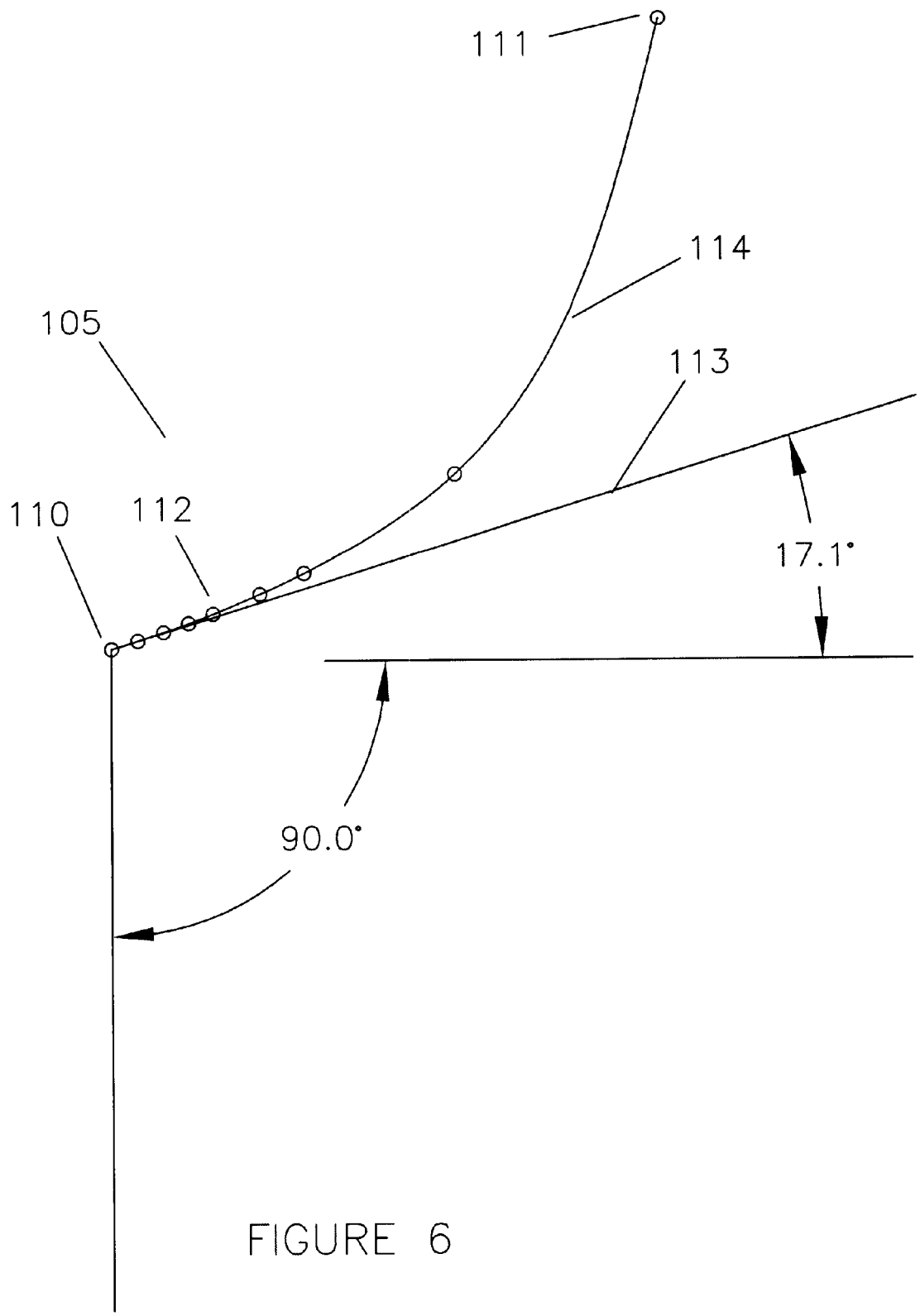
FIG. 6 is an expanded view of the locus of points from FIG. 5 showing that the departure angle of the locking segment with relationship with the first connector hub is approximately 17.1° in this embodiment.

Referring now to FIG. 6, an enlarged view of the locus of points at 105 is shown. Point 110 is the position of a point when the connector is fully locked. Point 111 is the position of the same point when the connector is unlocked 5 degrees. Points 112 indicate various points in between. The line 113 indicates that the curve 114 connecting the various points has a starting tangent at approximately 17.1 degrees. This means that the surface at 76 is sliding at the angle of approximately 17.1 degrees when the maximum preload is being exerted. This was the reason that the angle of 17.1 degrees was used in the layout of FIG. 3 to determine the centerline point of the optimal torus profile for the connector.

The particular embodiments disclosed above are illustrative only, as the invention may be modified, and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. A connector for connecting to a pressure vessel with one or more pressure vessel locking surfaces comprising:

a connector body having a passage extending therethrough and having one or more connector body locking surfaces formed thereon;

a plurality of circumferentially spaced locking segments adjacent one end of said connector body with one or more first inner surfaces on a first end suitable for engaging said one or more connector body locking surfaces, one or more second inner surfaces on a second end suitable for engaging said one or more pressure vessel locking surfaces, and a generally toroidal outer surface, a torus drive ring surrounding said locking segments having a generally toroidal curved inner surface for engaging the toroidal curved surface on said locking segments, said torus drive ring having a first position for moving said one or more first inner surfaces into engagement with said connector body and said second inner surfaces into contact with said one or more pressure vessel locking surfaces, and said torus drive ring having a second position for moving said one or more second inner surfaces out of engagement with said one or more pressure vessel locking surfaces, said generally toroidal outer surface on said locking segments having a first portion which conforms to said generally toroidal curved inner surface on said torus drive ring and having a second portion which does not conform to said generally toroidal curved inner surface of said torus drive ring when said torus drive ring moves between said first position and said second position, and said one or more connector body locking surfaces are in the shape of a portion of a torus.

2. The invention of claim 1, wherein said first portion extends from said first end to said second end of said locking segment.

3. The invention of claim 2, wherein said first portion is spaced centrally on the outer surface of said locking segment and said second portion is divided on each side of said first portion.

4. The invention of claim 1, further comprising orientation means to cause said locking segments to remain in the same orientation relative to said connector body during operations.

5. The invention of claim 4, wherein said orientation means is a post on said connector body and a slot on one or more of said locking segments.

6. The invention of claim 1 wherein said torus drive ring comprises an inner torus section and an outer piston section which are adjustable relative on one another to adjust the inside diameter of said inner torus section.

7. A connector for connecting to a pressure vessel with one or more pressure vessel locking surfaces comprising:

- a connector body having a passage extending therethrough and having one or more connector body locking surfaces formed thereon;
- a plurality of circumferentially spaced locking segments adjacent one end of said connector body with one or more first inner surfaces on a first end suitable for engaging said one or more connector body locking surfaces, one or more second inner surfaces on a second end suitable for engaging said one or more pressure vessel locking surfaces, and a generally toroidal outer surface,
- a torus drive ring surrounding said locking segments having a generally toroidal curved inner surface for engaging the toroidal curved surface on said locking segments, said torus drive ring having a first position for moving said one or more first inner surfaces into engagement with said connector body and said second inner surfaces into contact with said one or more pressure vessel locking surfaces, and said torus drive ring having a second position for moving said one or more second inner surfaces out of engagement with said one or more pressure vessel locking surfaces,
- said generally toroidal outer surface on said locking segments having a first portion which conforms to said generally toroidal curved inner surface on said torus drive ring and having a second portion which does not conform to said generally toroidal curved inner surface of said torus drive ring when said torus drive ring moves between said first position and said second position.

* * * * *